United States Patent
Nechaev (10) Patent No.: US 9,922,036 B2
(45) Date of Patent: Mar. 20, 2018

(54) SYSTEM AND METHOD FOR DUPLICATING FILES ON CLIENT DEVICE FOR CLOUD STORAGE

(71) Applicant: YANDEX EUROPE AG, Lucerne (CH)

(72) Inventor: Sergey Petrovich Nechaev, Novosibirsk (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/504,803

(22) PCT Filed: Feb. 2, 2016

(86) PCT No.: PCT/IB2016/050525
§ 371 (c)(1),
(2) Date: Feb. 17, 2017

(87) PCT Pub. No.: WO2017/001941
PCT Pub. Date: Jan. 5, 2017

(65) Prior Publication Data
US 2017/0286439 A1   Oct. 5, 2017

(30) Foreign Application Priority Data
Jun. 30, 2015  (RU) ................. 2015125962

(51) Int. Cl.
*G06F 7/00* (2006.01)
*G06F 17/30* (2006.01)
(52) U.S. Cl.
CPC .. *G06F 17/30088* (2013.01); *G06F 17/30109* (2013.01); *G06F 17/30203* (2013.01)
(58) Field of Classification Search
CPC ........ G06F 8/30; G06F 9/54; G06F 17/30097; G06F 17/30123
(Continued)

(56) References Cited

U.S. PATENT DOCUMENTS 8,903,838 B2    12/2014 Hunter et al.
2004/0103189 A1*  5/2004 Cherkasova ...... H04L 29/06027
                                               709/224
(Continued)

FOREIGN PATENT DOCUMENTS

EP    2535825 A1   12/2012
RU    2531569 C2   10/2014

OTHER PUBLICATIONS

International Search Report from PCT/IB2016/050525, dated May 11, 2016, Blaine R. Copenheaver.
(Continued)

*Primary Examiner* — Tony Mahmoudi
*Assistant Examiner* — Linh Black
(74) *Attorney, Agent, or Firm* — BCF LLP (57) ABSTRACT

Disclosed are systems, methods and computer program products for duplicating files on client device for storage in a cloud storage server. An example method includes: receiving, by a user device, a request to upload a file stored locally on the user device into the cloud storage server; determine time required to generate a unique file identifier for said file and time required to upload said file to the cloud storage server; responsive to the time required to generate the unique file identifier for said file exceeding the time required to upload said file to the cloud storage server, initiating the uploading of the file to the cloud storage server; and responsive to the time required to upload said file to the cloud storage server exceeding the time required to generate the unique file identifier, generating said unique file identifier and transmitting the unique file identifier to the cloud storage server.

15 Claims, 4 Drawing Sheets (58) Field of Classification Search
USPC .................... 707/697–698, 701, 747, 791
See application file for complete search history.

(56) References Cited

U.S. PATENT DOCUMENTS

| | | |
|---|---|---|
| 2009/0089337 A1 | 4/2009 | Perlin et al. |
| 2009/0132543 A1* | 5/2009 | Chatley ................ G06F 3/0613 |
| 2012/0173822 A1 | 7/2012 | Testardi et al. |
| 2013/0073691 A1 | 3/2013 | Quan et al. |
| 2013/0212269 A1 | 8/2013 | Kuosa et al. |
| 2013/0226876 A1 | 8/2013 | Gati et al. |
| 2013/0339317 A1 | 12/2013 | Kim et al. |
| 2014/0053002 A1* | 2/2014 | Muller ................ G06F 21/6209 713/193 |
| 2014/0129830 A1* | 5/2014 | Raudaschl .......... G06F 21/6218 713/165 |
| 2014/0136496 A1 | 5/2014 | Kuo |
| 2014/0157435 A1 | 6/2014 | Stamos et al. |
| 2014/0188510 A1* | 7/2014 | Samari ................ G06F 19/322 705/3 |
| 2015/0278024 A1* | 10/2015 | Barman .............. H04L 67/1095 707/634 |
| 2016/0105504 A1* | 4/2016 | Vallabhaneni ...... H04L 67/1097 709/217 |
| 2016/0142482 A1* | 5/2016 | Mehta ............... G06F 17/30575 709/203 |
| 2016/0350391 A1* | 12/2016 | Vijayan ............ G06F 17/30575 |

OTHER PUBLICATIONS

Nafi et al, A newer user authentication, file encryption and distributed server based cloud computing security architecture, In: arXiv preprint arXiv:1303.0598, Mar. 4, 2013, Retrieved from https://arxiv.org/ftp/arxiv/papers/1303/1303.0598.pdf.

Data deduplication, https://creativecommons.org/licenses/by-sa/3.0/, 5 pages.

ADSHEAD, Inline deduplication or post-process: Which one is right for your environment, http://www.computerweekly.com/tip/Inline-deduplication-or-post-process-Which-one-is-right-for-your-environment, 5 pages, retrieved Nov. 11, 2016.

* cited by examiner

Fig. 1

| File Size (and/or Type) | Hashing Algorithm | Time to Compute Hash(s) core i5, seconds | Time to Compute Hash(s) core i7, seconds |
|---|---|---|---|
| 10KB | SHA-256 | 0.921 | 0.718 |
| 100KB | SHA-256 | 0.83 | 0.652 |
| 1MB | SHA-256 | 0.924 | 0.789 |
| 10MB | SHA-256 | 0.915 | 0.715 |
| 100MB | SHA-256 | 1.427 | 1.209 |
| 1GB | SHA-256 | 18.28 | 16.412 |

Fig. 2A

| File Size (and/or Type) | Network Type (Wi-Fi/4G/Ethernet) | Bandwidth | Time to Upload File (seconds) |
|---|---|---|---|
| 10KB | Wifi | 54Mbps | 0.514 |
| 100KB | Wifi | 54Mbps | 0.510 |
| 1MB | Wifi | 54Mbps | 0.902 |
| 10MB | Wifi | 54Mbps | 3.14 |
| 100MB | Wifi | 54Mbps | 42.78 |
| 1GB | Wifi | 54Mbps | 636 |

SYSTEM AND METHOD FOR DUPLICATING FILES ON CLIENT DEVICE FOR CLOUD STORAGE

CROSS-REFERENCE

The present application claims priority to Russian Patent Application No 2015125962 filed Jun. 30, 2015, entitled "SYSTEM AND METHOD FOR DUPLICATING FILES ON CLIENT DEVICE FOR CLOUD STORAGE" the entirety of which is incorporated herein.

TECHNICAL FIELD

The disclosure relates to the field of data storage, and more specifically, to a system and method for duplication of files on client devices for storage in cloud storage servers.

BACKGROUND

Typically personal cloud storage services employ algorithms of file duplication, which allow the cloud storage server to identify files on a user device, which are already stored in the server in order not to download them again from the user device. When a user uploads a file to the cloud storage from a user device, the file is not being actually stored in the system. User device, from which the file is being uploaded, calculates a unique file identifier, which is usually based on a hash value or several hash values combined. User device then sends this identifier to the cloud storage server and, if a file with the same identifier is already present in the server, the server does not download the actual file from the user device, but creates a visual representation of the file in the user's personal cloud storage directory. This visual representation (e.g., symlink) is linked to the original file stored in the cloud storage server.

In cases when a file to be uploaded to the cloud storage server is large, calculation of the unique file identifier at the user device may be time and resource consuming. Therefore, there is a need for a more efficient mechanism for duplication of files at the user device.

SUMMARY

Disclosed are systems, methods and computer program products for duplication of files on client device for storage in a cloud storage server. In one example aspect, a method includes: receiving, by a user device, a request to upload a file stored locally on the user device into the cloud storage server; determine time required to generate a unique file identifier for said file and time required to upload said file to the cloud storage server; responsive to the time required to generate the unique file identifier for said file exceeding the time required to upload said file to the cloud storage server, initiating the uploading of the file to the cloud storage server; and responsive to the time required to upload said file to the cloud storage server exceeding the time required to generate the unique file identifier, generating said unique file identifier and transmitting the unique file identifier to the cloud storage server.

In one example aspect, the unique file identifier includes one or more hashes.

In another example aspect, determining time to upload the file to the cloud storage server, includes analyzing one or more of a bandwidth of the network connection between the user device and the cloud storage device, computational resources currently available at the user device, characteristics of the user device, and size and type of the file.

In another example aspect, the method further includes storing in a local storage of the user device the information about computational resources of the user device after they are analyzed in order not to analyze computational resources of the user device again next time.

In another example aspect, the method further includes determining the size of the file; and responsive to the size of the file exceeding a predetermined size, performing the steps of calculating, uploading and generating.

In another example aspect, the method may be implemented in one or more of: a browser code executed on the user device, in a code of a native cloud storage application running on the user device, and a website code executed on the user device.

In another example aspect, the method further includes starting calculation of the unique file identifier substantially simultaneously with the uploading of the file to the cloud storage server.

In another example aspect, the method further includes if uploading of the file to the cloud storage server is finished earlier than generation of the unique file identifier, terminating generation of the unique file identifier; and if generation of the unique file identifier is finished earlier than uploading of the file to the cloud storage server, transmitting the unique file identifier to the cloud storage server, and: if the file is unique, continue uploading the file to the cloud storage server; if the file is not unique, terminating uploading of the file to the cloud storage server.

In another example aspect, a probability coefficient denoting the average probability of the file being unique is calculated using following inequality:

$$\frac{S}{V_h} + \frac{S}{V_{upl}} \times \alpha < \frac{S}{V_{upl}},$$

wherein
S—size of the file,
$V_h$—speed of generating the unique file identifier on the user device,
$V_{upl}$—speed of uploading the file to the cloud storage server,
α—average probability of a file being a unique file in the cloud storage server.

In another example aspect, the inequality $$\frac{S}{V_h} + \frac{S}{V_{upl}} \times \alpha < \frac{S}{V_{upl}}$$

is simplified into $t_h < t_{upl}*(1-\alpha)$, wherein time t is calculated as, and if the simplified inequality is true, than generating the unique file identifier on the user device.

In another example aspect, a system for duplication of files on a user device, includes a hardware processor of the user device being configured to: receive a request to upload a file stored locally on the user device into the cloud storage server; determine time required to generate a unique file identifier for said file and time required to upload said file to the cloud storage server; responsive to the time required to generate the unique file identifier for said file exceeding the time required to upload said file to the cloud storage server, initiate the uploading of the file to the cloud storage server; and responsive to the time required to upload said file to the cloud storage server exceeding the time required to generate the unique file identifier, generate said unique file identifier and transmitting the unique file identifier to the cloud storage server.

In another example aspect, non-transitory computer readable medium storing computer executable instructions for duplication of files on a user device, including instructions for: receiving a request to upload a file stored locally on the user device into the cloud storage server; determining time required to generate a unique file identifier for said file and time required to upload said file to the cloud storage server; responsive to the time required to generate the unique file identifier for said file exceeding the time required to upload said file to the cloud storage server, initiating the uploading of the file to the cloud storage server; and responsive to the time required to upload said file to the cloud storage server exceeding the time required to generate the unique file identifier, generating said unique file identifier and transmitting the unique file identifier to the cloud storage server.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of systems, methods and computer program products for duplication of files on a client device for storage in a cloud storage server. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Figure 1:
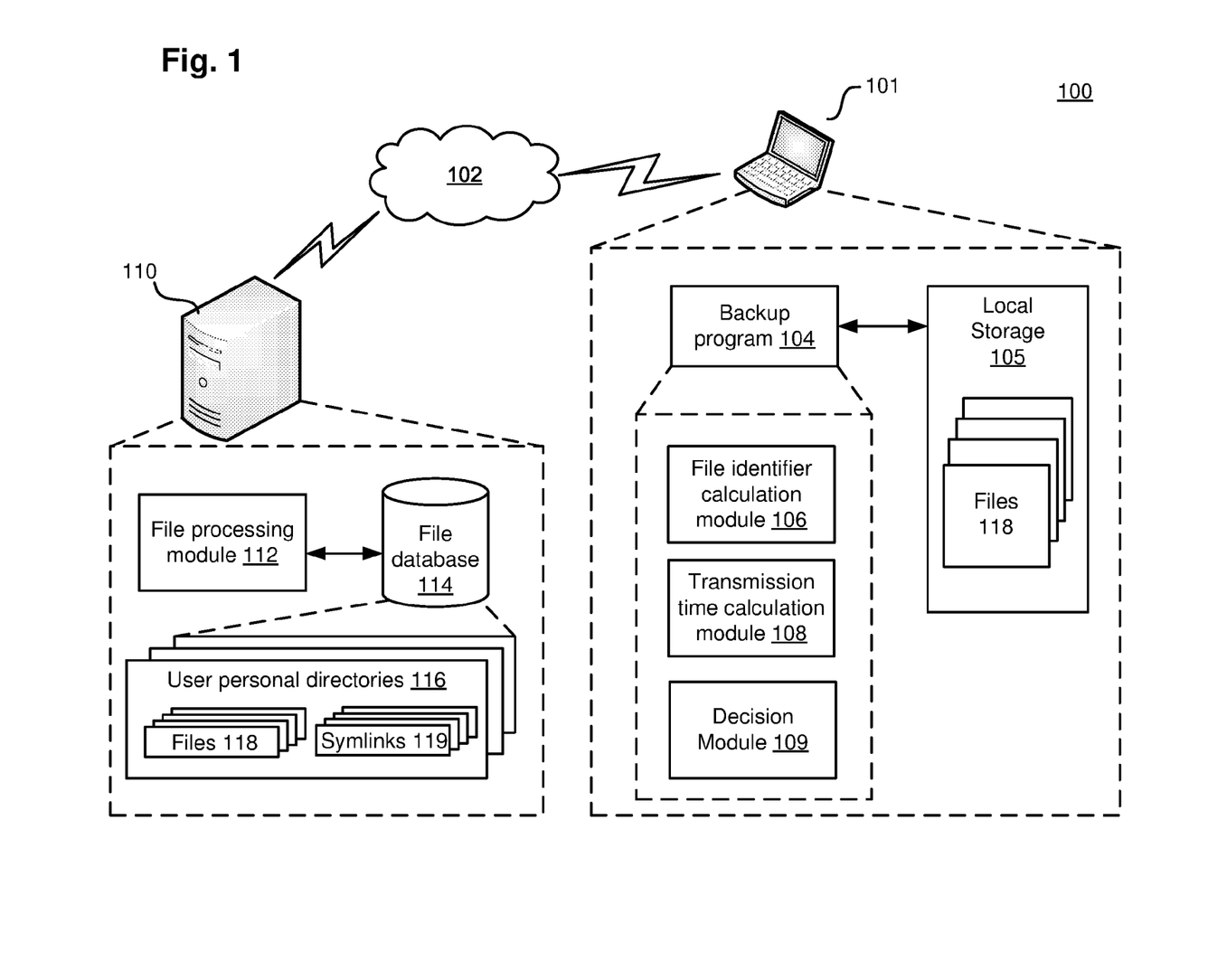
FIG. 1 is a diagram illustrating an example network architecture for duplication of files on client device for storage in a cloud storage server.

FIG. 1 is a diagram illustrating an example system for duplication of files on client device for storage in a cloud storage server. The system 100 includes a user device 101 (also referred here interchangeably as a client device) that communicates with a cloud storage server 110 via network 102, such as the Internet. The user device 101 may be a personal computer, a laptop, a tablet, a mobile phone or any other types of data processing device. The user device 101 may execute a backup program 104 that performs duplication (or backup) of files 118 stored in the local storage 105 of the user device 101 to the cloud storage server 110. The backup program 104 may include but not limited to, a data backup application, a security application, a mobile app, a web browser, a cloud storage application running on the user device, and an HTML code or script executed by the web browser of the client device.

As briefly explained above, personal cloud storage services, such as the one provided by the cloud storage server 110, employ algorithms of file duplication, which allow the cloud storage server 110 to identify files on a user device, which are already stored in the server in order not to download them again from the user device 101. When a user uploads a file 118 to the cloud storage server 110 from a user device 101, the file 118 is not being actually stored on the server 110. User device 101, from which the file 118 is being uploaded, calculates a unique file identifier, which is usually based on a hash value or several combined hash values of the file. User device 101 then sends this identifier to the cloud storage server 110 and, if a file with the same identifier is already present in the server 110, the server 110 does not download the actual file 118 from the user device 101, but creates a visual representation (symlink) 119 of the file 118 in the user's personal cloud storage directory 116. This symlinks 119 are linked to the original files 118, which may be also stored in the cloud storage server 110.

In cases when the file 118 to be uploaded to the cloud storage server 110 is large (e.g., several hundred megabytes or gigabytes, as in case of high resolution photos, large video files, etc.), there might be a situation when calculating the unique file identifier at the user device 101 takes more time then actual uploading the file to the cloud storage server 110, as calculating hashes for large files is a resource-comsuming task and may be inefficient for a mobile user device having low data processing capabilities and limited memory resources.

To address this problem, the backup program 104 may implement an enhanced algorithm for duplication of files on the user device 101 for storage in the cloud storage server 110. According to one example aspect, when a user initiates a process of uploading a file 118 stored in a local storage 105 of the user device 101 into the cloud storage server 110, the backup program 104 estimates time needed to calculate a unique file identifier for the file 118 and the time needed to actually upload the file 118 to the cloud storage server 110. If the time needed to calculate the identifier is less than the upload time, the backup program 104 calculates the unique file identifier for file 118 and sends it to the cloud storage server 110. The file processing module 112 of the cloud storage server 110 uses the received file identifier to check whether a copy of the corresponding file 118 is contained in the file database 114. If the file 118 is not found in the server database 114, the file processing module 112 initiates the uploading of the file 118 from the client device 101 to the file database 114. If the server 110 does contain a copy of the file 118, the file processing module 112 creates a symlink 119 of the file 118 and stores it in the user's personal cloud storage directory 116 in the file database 114. If the time needed to calculate the unique file identifier exceeds the time needed to upload the file 118 into the cloud storage server 110, the backup program 104 does not calculate the unique file identifier and starts uploading the file 118 to the cloud storage server 110. After the file 118 is uploaded into the cloud storage server 110, the file processing module 112 calculates the unique file identifier for file 118 and runs a duplication process afterwards.

The described exemplary enhanced algorithm for duplication of files on the user device for storage in a cloud storage server provide a number advantages. The file duplication mechanism provides a balance between server-side and client-side hash calculations such that the upload time perceived by the user is minimized. It also offers smart switching between client-side and server-side hashes calculation aimed at enhancing user experience. In should be noted that to improve efficiency of the algorithm, the logic of the solution may be selectively used only for files exceeding certain size. Thus, for example, the backup program 104 may automatically compute hashes of small files (e.g., less than 10 KB) on the user device 101 and send them to the cloud storage server 110 because it does not take much computing resources.

More specifically, to implement the above described file duplication algorithm, the backup program 104 may include a plurality of software modules that can be executed by the hardware processor of the user device 101, including a unique file identifier calculation module 106, a transmission time calculation module 108 and decision module 109. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on a hardware processor of a general purpose computer (such as the one described in greater detail in FIG. 4 below). Accordingly, each module of the backup program 104 can be realized in a variety of suitable configurations, and should not be limited to any particular implementation exemplified herein.

In one example aspect, the file identifier calculation module 106 of the backup program 104 is configured to calculate time required to generate a unique file identifier for a file 118 on the user device 101, and actually generate the file identifier for the file 118. When estimating the time required to generate a unique file identifier, module 106 may consider the size and type of the file, the type of unique file identifier, computational resources currently available at the user device 101, characteristics of the user device 101, and other parameters.

For example, the size of the file may significantly affect the time that it takes to generate a hash (e.g., SHA-256) of that file. For example, a user device that has Intel Core i5 processor may require approximately 0.921 seconds to generate a SHA-256 hash of a 10 KB file; and about 18.28 seconds to generate a SHA-256 hash of 1 GB file, which is 20 times longer.

In another example, the type of unique file identifier may indicates the type of hashing algorithm used to generate the identifier, such as SHA-256, SHA-512, MD5 or the like, and also may be used by the file identifier calculation module 106 in estimating hashing time. Different types of hashing algorithms have different computational complexities, as known to those of ordinary skill in the field of computer and software engineering; as such, the time of computing a hash of a file using different hashing algorithms will be different.

In yet another example, the characteristics of the user device 101 and available computational resources of the user device 101 may also affect the time it takes to compute a hash of a file 118 on the user device 101. For example, a user device that has a multi-core processor will calculate a hash of a file faster than a user device that has single core processor, because a multi-core CPUs has great data processing capability than a single core CPU. In another example, if the user device 101 already running a resource intensive task, such as plays a video game, or performs an antivirus scan of its hard drive, then it has limited computational resources available for calculating hash of the file, which will increase hashing time.

In one example aspect, the file identifier calculation module 106 can save the information about computational resources and characteristics of the user device in a local storage 105 in order not to analyze it again next time when duplication of another file is requested. The file identifier calculation module 106 can later use the stored information to estimate the time for generating unique file identifiers on the user device 101.

Figure 2A:
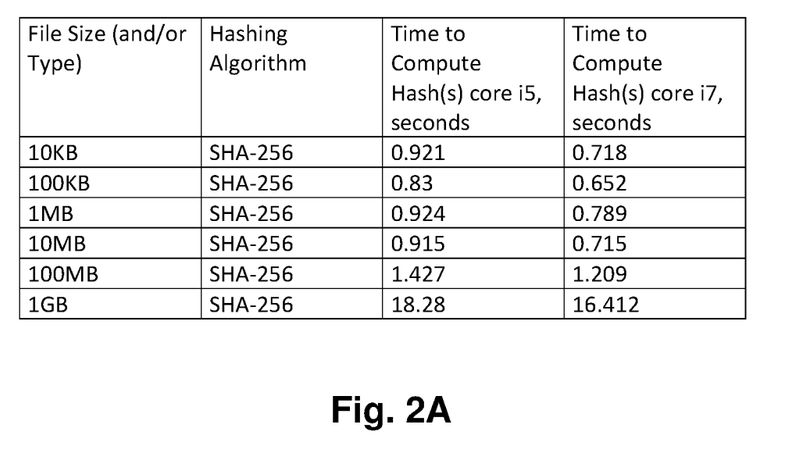
FIGS. 2A and 2B illustrate tables for example test data for duplication of files on client device for storage in a cloud storage server.

Table in FIG. 2A provides several examples of time estimated by the file identifier calculation module 106 for computing a SHA-256 hash of files of different sizes on two different types of user devices. In one example aspect, the file identifier calculation module 106 may use this Table to estimate the time for calculating a unique file identifier for a file 118 when upload is requested. For example, according to the table, it takes approximately 0.921 seconds to compute SHA-256 hash of a 10 KB file on a user device having Intel Core i5 processor; and about 0.718 seconds to compute SHA-256 hash of the same size file on a user device having Intel Core i7 processor. In another example, it takes approximately 18.28 seconds to compute SHA-256 hash of a 1 GB file on a user device having Intel Core i5 processor; and about 16.412 seconds to compute SHA-256 hash of the same size file on a user device having Intel Core i7 processor.

In one example aspect, the transmission time calculation module 108 of the backup program 104 is configured to estimate time required to upload file 118 to the cloud storage server 110. When estimating the upload time of a file, module 108 may consider the size and type of the file, the bandwidth of the network connection between user device 101 and server 110, computational resources currently available at the user device 101, characteristics of the user device 101, and other parameters. For example, the smaller is the size of the file, the faster it will be uploaded by the user device 101 to the cloud storage server 110. In another example, the greater is the bandwidth of a communication channel between the user device 101 and the cloud storage server 110, the greater will be the upload speed of the file. In yet another example, if the user device 101 is already making or scheduled to make a large data transmission over the network, than upload of the file 118 might be delayed and this time delay may be added to the upload time estimate by the transmission time calculation module 108.

Figure 2B:
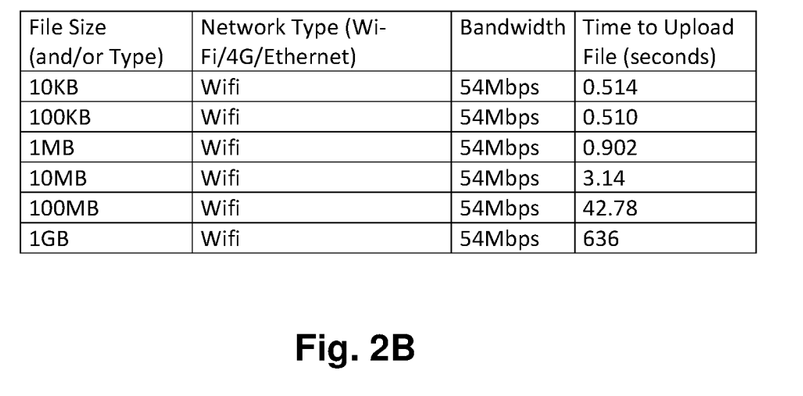

In one example aspect, the transmission time calculation module 108 can save in a local storage 105 information about upload times of different size files on different networks in order not to analyze it again next time when duplication of another file is requested. The stored information may be later used to estimate upload time of files to the server 110. Table in FIG. 2B provides several examples of stored estimates of upload times for files of different sizes. In one example aspect, the transmission time calculation module 108 may use this Table to estimate the upload time for a file to the cloud storage server 110. For example, according to the table, it takes approximately 0.514 seconds to upload a 10 KB file over a 54 Mbps Wi-Fi network; and about 636 seconds to upload a 1 GB file over the same network connection.

In one example aspect, the decision module 109 of the backup program 104 is configured to compare the estimated time for generating the unique file identifier with the estimated time for uploading the file to the cloud storage server 110. Then, responsive to the time required to generate the unique file identifier for the file exceeding the time required to upload said file to the cloud storage server 110, the decision module 109 is configured to initiate the uploading of the file 118 to the cloud storage server 110. However, responsive to the time required to upload said file to the cloud storage server 110 exceeding the time required to generate the unique file identifier, the decision module 109 generates said unique file identifier and transmits the unique file identifier to the cloud storage server 110.

For example, with reference to tables in FIGS. 2A and 2B, if the decision module 109 determines that the time estimated to compute a SHA-256 hash for a 100 KB file on an Intel Core i5 user device 101 is about 0.83 seconds, and the time to upload the same file to the cloud storage server 110 is about 0.51 seconds, then the decision module 109 instructs the backup software 104 to upload the file to the storage server 110 because it takes less time than computing the hash function of the file on the user device 101. However, if the decision module 109 determines that the time estimated to compute a SHA-256 hash for a 10 MB file on an Intel Core i7 user device 101 is about 0.715 seconds, and the time to upload the same file to the cloud storage server 110 is about 3.14 seconds, then the decision module 109 instructs the backup software 104 to calculate the hash function of the file on the user device 101 and send the calculated hash function to the cloud storage server 110 because computation of the hash for this file on the user device 101 takes less time than uploading of the file to the server 110. If the actual file size is not found in the tables 2A and 2B, the decision module 109 may find the nearest closes file size approximation and use it to estimate hashing time and upload time. Thus, for example, if the actual file size is about 120 KB, then the decision module 109 may use hashing time and upload time estimates for 100 KB file from the tables 2A and 2B.

In another example aspect, the decision module 109 may use heuristically information about the available computational resources of the user device, characteristics of the user device, the type of and size of the file and other available information to determine whether to calculate the unique file identifiers on the user device 101 or on the cloud storage server 110. For example, if the user device 101 is a mobile device (e.g., a smart phone or tablet), which typically have low computing power, the decision module 109 may not compute hashes on this type of the device, and start uploading of the file to the cloud storage server 110 right away. In another example, if CPU load of the user device 101 exceeds a certain threshold, the decision module 109 may decide not to calculate hashes on the user device and start uploading right away. In another example, if the battery of a mobile user device 101 is low, the decision module 109 may not to calculate hashes and upload the file at once. Alternatively, if the file is big (e.g., 1 GB file) and the battery charge left is so low that it is apparent that the file cannot be uploaded with the remaining charge, the decision module 109 may instruct the backup program 104 to calculate hash and sent it to the server 110, as it will allow to at least have the file in the storage in case it is a duplicate, which is better than accomplishing nothing.

In one example aspect, the decision module 109 may also take factor in its decision making process of whether to upload a file to the cloud storage server or not the uniqueness of different file types (e.g., images, videos, and pdfs. For example, there is greater likelihood that uploaded photos are unique than the uploaded pdfs, in which case, if the file is considered to be unique, the decision module 109 will upload the file to the cloud storage server 110 where the hash of the file will be calculated; if the file is not considered to be unique, calculate hash of the file on the user device 101 and send the hash to the cloud storage server 110.

In yet one example aspect, the decision module 109 may further use probability coefficient denoting the average probability of the file being a unique file in its decision making process of whether to upload a file to the cloud storage server or not. This probability coefficient may be described with a following inequality:

$$\frac{S}{V_h} + \frac{S}{V_{upl}} \times \alpha < \frac{S}{V_{upl}} \quad (1)$$

S—size of the file, $V_h$—speed of generating the unique file identifier on the user device (e.g., hashing speed 60 MB/sec), $V_{upl}$—speed of uploading the file to the cloud storage server (e.g., 6 MB/sec), α—average probability of a file being a unique file in the cloud storage server, calculated as average for the whole cloud storage server, may vary from 0—all files are non-unique, to 1—all files are unique.

In one example embodiment, the inequality (1) can be simplified into $t_h < t_{upl}*(1-\alpha)$, where time t is calculated as. Thus, if the simplified inequality is true (i.e., hashing time is less than upload time), the unique identifiers may be calculated on the user device 101. And, if the simplified inequality is false (i.e., hashing time is greater than upload time), the unique file identifiers may be calculated by the cloud storage server 110.

In yet another example aspect, the decision module 109 may start calculation of hashes for a file 118 substantially simultaneously with the uploading of the file 118 to the server 110. And, depending on which process ends earlier the following logic may be executed by the decision module 109: if uploading of the file to the cloud storage server 110 is finished earlier than generation of the unique file identifier on the user device 101, the decision module 109 terminates generation of the unique file identifier; and if generation of the unique file identifier is finished earlier than uploading of the file to the cloud storage server 110, the decision module transmits the unique file identifier to the cloud storage server 110, and then: if the file is unique, continue uploading the file to the cloud storage server 110; if the file is not unique, terminating uploading of the file to the cloud storage server 110.

Figure 3:
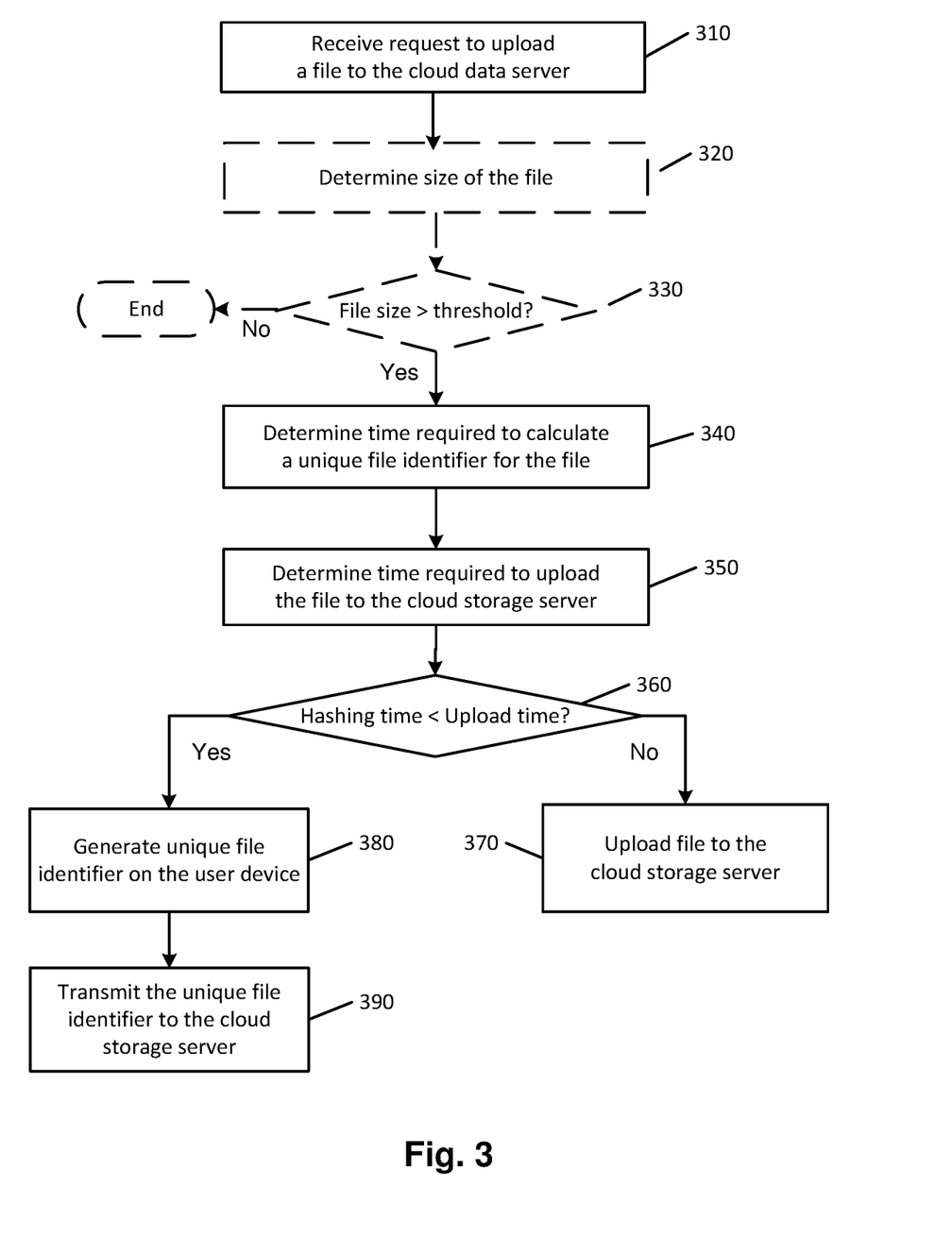
FIG. 3 is a flow diagram illustrating an example method for duplication of files on client device for storage in a cloud storage server.

FIG. 3 is a flow diagram illustrating an example method for duplication of files on client device for storage in a cloud storage server. At step 310, the backup program 104 receives a request from a user or cloud storage server to upload a file to cloud storage server 110. Next at steps 320 and 330, which are optional in one example aspect, the backup program 104 determines the size of the file and, based on the file size, determines whether to continue with the duplication process. If file size exceeds a certain threshold, e.g., 10 KB, the method continues and proceeds to step 340, in which the file identifier calculation module 106 determines the time required to generate a unique file identifier for the file. At step 350, the transmission time calculation module 108 determines the time required to upload said file to the cloud storage server 110. Next at step 360, the decision module 109 compares the hashing time and upload time estimates. Next at step 370, responsive to the time required to generate the unique file identifier for the file exceeding the time required to upload said file to the cloud storage server, the decision module 109 initiates uploading of the file to the cloud storage server 110. Alternatively, in steps 380 and 390, respectively, responsive to the time required to upload the file to the cloud storage server exceeding the time required to generate the unique file identifier, the decision module 109 generates said unique file identifier on the user device 101 and transmits the unique file identifier to the cloud storage server 110.

Figure 4:
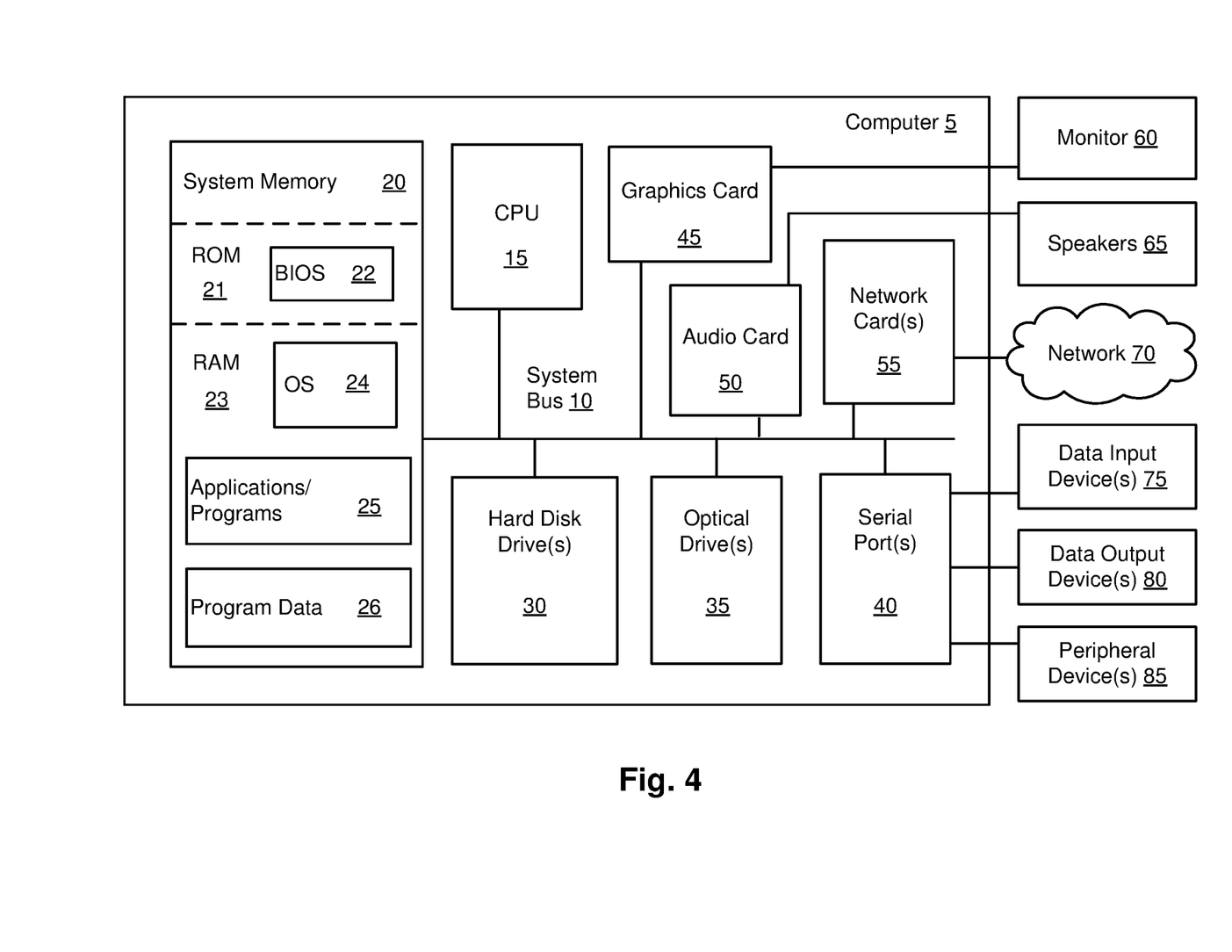
FIG. 4 is a diagram illustrating an example aspect of a general-purpose computer system on which are implemented the systems and methods for for duplication of files on client device for storage in a cloud storage server.

FIG. 4 depicts one example aspect of a computer system 5 that may be used to implement the disclosed systems and methods for duplication of files on client device for storage in a cloud storage server. The computer system 5 may include, but not limited to, an application server (e.g., server 110), a web server, a personal computer, a notebook, tablet computer, a smart phone or other type of data processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for duplication of files on a user device, the user device being connected to a cloud storage server over a communication network, the method comprising:

receiving, by a hardware processor of a user device, a request to upload a file stored locally on the user device into the cloud storage server;

responsive to the request, determining, by the hardware processor, a time required to generate a unique file identifier for said file, the unique file identifier for verifying a presence of a duplicate of said file on the cloud storage server, a time required to upload said file to the cloud storage server, and an average probability of said file not being a unique file on the cloud storage server;

responsive to (i) the time required to generate the unique file identifier for said file exceeding (ii) the time required to upload said file to the cloud storage server multiplied by the average probability of the file not being the unique file on the cloud storage server, initiating, by the hardware processor, the uploading of the file to the cloud storage server;

responsive to the time required to upload said file to the cloud storage server multiplied by the average probability of the file not being the unique file on the cloud storage server exceeding the time required to generate the unique file identifier, executing steps of:

generating, by the hardware processor, said unique file identifier and transmitting the unique file identifier to the cloud storage server;

receiving, from the cloud storage server, an indication of the presence of the unique file number on the cloud storage server; and responsive to the indication of the presence of the unique file number on the cloud storage server being negative, initiating, by the hardware processor, the uploading of the file to the cloud storage server.

2. The method of claim 1, wherein the unique file identifier includes at least one hash of the file.

3. The method of claim 1, wherein determining time to upload the file to the cloud storage server, includes analyzing one or more of a bandwidth of the network connection between the user device and the cloud storage device, computational resources currently available at the user device, characteristics of the user device, and a size and a type of the file.

4. The method of claim 3, further comprising:
storing in a local storage of the user device the information about computational resources of the user device after they are analyzed in order not to analyze computational resources of the user device again next time.

5. The method of claim 1, wherein the determining the time required to generate the unique file identifier, the time required to upload said file on the cloud storage server, and the average probability of said file not being unique on the cloud storage server further comprises determining the size of the file; and
wherein the steps of the initiating the uploading of the file to the cloud storage server and the transmitting the unique file identifier to the cloud storage server are executed only in response to the size of the file exceeding a predetermined size.

6. The method of claim 1, wherein the method is implemented in one or more of: a browser code executed on the user device, in a code of a native cloud storage application running on the user device, and a website code executed on the user device.

7. The method of claim 1, further comprising:
starting calculation of the unique file identifier substantially simultaneously with the uploading of the file to the cloud storage server.

8. The method of claim 7, further comprising:
if uploading of the file to the cloud storage server is finished earlier than generation of the unique file identifier, terminating generation of the unique file identifier; and
if generation of the unique file identifier is finished earlier than uploading of the file to the cloud storage server, transmitting the unique file identifier to the cloud storage server, and:
if the file is unique, continue uploading the file to the cloud storage server;
if the file is not unique, terminating uploading of the file to the cloud storage server.

9. A system for duplication of files on a user device, the user device being connected to a cloud storage server over a communication network, the system comprising:
a hardware processor of the user device being configured to:
receive a request to upload a file stored locally on the user device into the cloud storage server;
responsive to the request, determine a time required to generate a unique file identifier for said file, the unique file identifier for verifying a presence of a duplicate of said file on the cloud storage server a time required to upload said file to the cloud storage server, and an average probability of said file not being a unique file on the cloud storage server;
responsive to (i) the time required to generate the unique file identifier for said file exceeding (ii) the time required to upload said file to the cloud storage server multiplied by the average probability of the file not being the unique file on the cloud storage server, initiate the uploading of the file to the cloud storage server;
responsive to the time required to upload said file to the cloud storage server multiplied by the average probability of the file not being the unique file on the cloud storage server exceeding the time required to generate the unique file identifier:
generate said unique file identifier and transmit the unique file identifier to the cloud storage server;
receive, from the cloud storage server, an indication of the presence of the unique file number on the cloud storage server; and
responsive to the indication of the presence of the unique file number on the cloud storage server being negative, initiate the uploading of the file to the cloud storage server.

10. The system of claim 9, wherein the unique file identifier includes at least one hash of the file.

11. The system of claim 9, wherein determining time to upload the file to the cloud storage server, includes analyzing one or more of a bandwidth of the network connection between the user device and the cloud storage device, computational resources currently available at the user device, characteristics of the user device, and a size and a type of the file.

12. The system of claim 9, wherein the hardware processor is further configured to:
store in a local storage of the user device the information about computational resources of the user device after they are analyzed in order not to analyze computational resources of the user device again next time.

13. The system of claim 9, wherein the hardware processor is further configured to, during the determining the time required to generate the unique file identifier for said file, the time required to upload said file to the cloud storage server, and the average probability of said file not being a unique file on the cloud storage server:
  determine the size of the file; and
  wherein the hardware processor is further configured to execute the steps of the initiating the uploading of the file to the cloud storage server and the transmitting the unique file identifier in response to to the size of the file exceeding a predetermined size.

14. The system of claim 9, wherein the hardware processor is further configured to:
  start calculation of the unique file identifier substantially simultaneously with the uploading of the file to the cloud storage server.

15. The system of claim 14, wherein the hardware processor is further configured to:
  if uploading of the file to the cloud storage server is finished earlier than generation of the unique file identifier, terminate generation of the unique file identifier; and
  if generation of the unique file identifier is finished earlier than uploading of the file to the cloud storage server, transmit the unique file identifier to the cloud storage server, and:
    if the file is unique, continue uploading the file to the cloud storage server;
    if the file is not unique, terminate uploading of the file to the cloud storage server.

\* \* \* \* \*